United States Patent
Shikuri et al.

(10) Patent No.: US 11,441,033 B2
(45) Date of Patent: Sep. 13, 2022

(54) SHEET-LIKE MATERIAL

(71) Applicant: Toray Industries, Inc., Tokyo (JP)

(72) Inventors: Ryuji Shikuri, Gifu (JP); Makoto Nishimura, Otsu (JP); Yukihiro Matsuzaki, Gifu (JP); Satoshi Yanagisawa, Gifu (JP)

(73) Assignee: TORAY INDUSTRIES, INC., Tokyo (JP)

(*) Notice: Subject to any disclaimer, the term of this patent is extended or adjusted under 35 U.S.C. 154(b) by 637 days.

(21) Appl. No.: 16/488,293

(22) PCT Filed: Feb. 6, 2018

(86) PCT No.: PCT/JP2018/003928
§ 371 (c)(1),
(2) Date: Aug. 23, 2019

(87) PCT Pub. No.: WO2018/159228
PCT Pub. Date: Sep. 7, 2018

(65) Prior Publication Data
US 2019/0375935 A1 Dec. 12, 2019

(30) Foreign Application Priority Data
Feb. 28, 2017 (JP) .............................. JP2017-036093

(51) Int. Cl.
| C08L 75/04 | (2006.01) |
| C08J 5/04 | (2006.01) |
| C08J 5/18 | (2006.01) |
| D06M 15/564 | (2006.01) |
| D06M 101/32 | (2006.01) |

(52) U.S. Cl.
CPC .............. *C08L 75/04* (2013.01); *C08J 5/046* (2013.01); *C08J 5/18* (2013.01); *D06M 15/564* (2013.01); *C08J 2375/04* (2013.01); *C08J 2467/02* (2013.01); *C08L 2203/16* (2013.01); *C08L 2205/16* (2013.01); *D06M 2101/32* (2013.01)

(58) Field of Classification Search
CPC .. C08L 75/04; C08L 2203/16; C08L 2205/16; C08J 5/046; C08J 5/18; C08J 2375/04; C08J 2467/02; D06M 15/564; D06M 2101/32
See application file for complete search history.

(56) References Cited

U.S. PATENT DOCUMENTS

| 4,013,702 A | 3/1977 | Cartier et al. |
| 4,105,641 A | 8/1978 | Buysch et al. |
| 2007/0197116 A1* | 8/2007 | Yakake ................ D06N 3/0004 442/361 |
| 2012/0015574 A1 | 1/2012 | Severich et al. |
| 2013/0000772 A1 | 1/2013 | Tang |
| 2015/0291724 A1 | 10/2015 | Kusano et al. |
| 2019/0375935 A1 | 12/2019 | Shikuri et al. |

FOREIGN PATENT DOCUMENTS

| CN | 101525847 A | 9/2009 |
| CN | 104884499 A | 9/2015 |
| EP | 0302712 A2 | 2/1989 |
| EP | 1688447 A1 | 8/2006 |
| EP | 2940056 A1 | 11/2015 |
| EP | 3159366 A1 | 4/2017 |

(Continued)

OTHER PUBLICATIONS

Indonesian Substantive Examination Result Phase I for Indonesian Application No. P00201907921, dated Jul. 25, 2021, with translation, 5 pages.
Extended European Search Report for European Application No. 18760649.6, dated Apr. 8, 2020, 4 pages.
Indian Examination Report for Indian Application No. 201947036182, dated Dec. 27, 2021 with translation, 5 pages.

(Continued)

*Primary Examiner* — Edward J Cain
(74) *Attorney, Agent, or Firm* — RatnerPrestia

(57) ABSTRACT

The present invention provides a sheet-like material having soft texture, durability capable of withstanding practical use, and abrasion resistance. The sheet-like material of the present invention is a sheet-like material containing a nonwoven fabric composed of an ultrafine fiber having an average single fiber diameter 0.3 to 7 μm; and an elastic resin, wherein the elastic resin is a polyurethane resin (D) which contains: as essential constituent monomers, a copolymerized polycarbonate diol (A1) which contains a structural unit derived from C3-5 alkane diol (a1) and a structural unit derived from C8-12 alkane diol (a2), the molar ratio of the alkanediol (a2) with respect to the total number of moles of the alkanediol (a1) and the alkanediol (a2) being 50 to 95 mole %; a polycarbonate diol (A2) containing a structural unit derived from a C4-6 alkane diol (a3); an organic diisocyanate (B); and a chain extender (C), and the polyurethane resin (D) satisfies the following conditions (1) to (3):

(1) The copolymerized polycarbonate diol (A1) has a heat quantity of fusion (ΔH) o 40 to 100 J/g, the heat quantity of fusion (ΔH) being determined according to a melting point measuring method provided in JIS K7121-1987;

(2) The polycarbonate diol (A2) has a heat quantity of fusion (ΔH) of 0 J/g;

(3) A difference (ΔTm) in a melting point (Tm) between a mixture (A12) of the copolymerized polycarbonate diol (A1) with the polycarbonate diol (A2) and the copolymerized polycarbonate diol (A1) is 1.5° C. or lower, the melting point (Tm) being determined by a melting point measuring method provided in JIS K7121-1987.

9 Claims, No Drawings

(56) References Cited

FOREIGN PATENT DOCUMENTS

| | | | |
|---|---|---|---|
| JP | 60195117 | A | 10/1985 |
| JP | 02158617 | A | 6/1990 |
| JP | 02289616 | A | 11/1990 |
| JP | 03140318 | A | 6/1991 |
| JP | 047327 | A | 1/1992 |
| JP | 0532754 | A | 2/1993 |
| JP | 0551428 | A | 3/1993 |
| JP | 2005171228 | A | 6/2005 |
| JP | 2006306999 | A | 11/2006 |
| JP | 2016027114 | A | 2/2016 |
| JP | 6828743 | B2 | 2/2021 |
| RU | 2496799 | C2 | 10/2013 |
| RU | 2527367 | C1 | 8/2014 |
| WO | 2005049685 | A1 | 6/2005 |
| WO | 2005095706 | A1 | 10/2005 |
| WO | 2015194670 | A1 | 12/2015 |

OTHER PUBLICATIONS

International Search Report and Written Opinion for International Application No. PCT/JP2018/003928, dated Apr. 17, 2018—5 pages.
Russian Office Action with Search Report for Russian Application No. 2019129804, dated Mar. 12, 2021, with translation, 11 pages.
Chinese Office Action for Chinese Application No. 201880013322. 6, dated Jun. 22, 2021, with translation, 9 pages.

\* cited by examiner

SHEET-LIKE MATERIAL

CROSS REFERENCE TO RELATED APPLICATIONS

This is the U.S. National Phase application of PCT/JP2018/003928, filed Feb. 6, 2018, which claims priority to Japanese Patent Application No. 2017-036093, filed Feb. 28, 2017, the disclosures of these applications being incorporated herein by reference in their entireties for all purposes.

FIELD OF THE INVENTION

The present invention relates to a sheet-like material, particularly preferably to a sheet-like material having nap.

BACKGROUND OF THE INVENTION

Sheet-like materials, in which a base material composed of fibers is impregnated with a polyurethane resin, having a suede-like or nubuck-like surface feel and having nap on a surface thereof are widely known.

Desired properties of a sheet-like material can be arbitrarily and widely designed by combination of a base material composed of fibers and a polyurethane resin, and particularly, selection of the polyurethane resin is important in order to obtain both of a durability and a soft texture capable of withstanding practical use of the sheet-like material. For example, an issue has hitherto been known in which when a polycarbonate diol such as 1,6-hexanediol polycarbonate diol is applied as a polymer diol component, hydrolysis resistance and weatherability are excellent, but texture becomes hard. This is caused due to the high crystallinity of the polycarbonate diol composed of 1,6-hexanediol. In the polyurethane using that diol, a soft segment component is crystallized to impair elasticity, thus resulting in the hard texture. In order to exhibit the durability including the hydrolysis resistance, light resistance and heat resistance, capable of withstanding practical use, accordingly, it is important to apply a polycarbonate-based polyurethane using a polycarbonate diol, but there is an issue in which the texture of the sheet-like material becomes hard. For that reason, in order to soften the texture, techniques in which the crystallinity of the polycarbonate diol is reduced have been studied.

For example, a method in which a copolymerized polycarbonate diol of a C6 alkanediol and a C9 alkanediol is applied (see Patent Document 1), a method in which a copolymerized polycarbonate diol composed of a C5 alkanediol and a C6 alkanediol is applied (see Patent Document 2), a method in which a copolymerized polycarbonate diol of a C3-10 side chain alkanediol and a C6 alkanediol is applied (see Patent Document 3), a method in which a copolymerized polycarbonate diol composed of a C9 linear alkanediol, a C9 branched alkanediol, and cyclohexane dimethanol is applied (see Patent Document 4), a method in which a copolymerized polycarbonate diol composed of a C4 alkanediol and a C5 alkanediol is applied, a method in Patent Document 7 in which a copolymerized polycarbonate diol composed of a C4 alkanediol and a C6 alkanediol is applied (see Patent Documents 5 to 7) have been proposed.

When the crystallinity of the polycarbonate diol is reduced by these methods, however, problematically, mechanical strength is insufficient and abrasion resistance is reduced, though the texture of the sheet-like material can be softened.

PATENT DOCUMENTS

Patent Document 1: Japanese Patent Laid-open Publication No. Sho 60-195117
Patent Document 2: Japanese Patent Laid-open Publication No. Hei 2-289616
Patent Document 3: Japanese Patent Laid-open Publication No. Hei 2-158617
Patent Document 4: Japanese Patent Laid-open Publication No. Hei 3-140318
Patent Document 5: Japanese Patent Laid-open Publication No. Hei 4-7327
Patent Document 6: Japanese Patent Laid-open Publication No. Hei 5-32754
Patent Document 7: Japanese Patent Laid-open Publication No. Hei 5-51428

SUMMARY OF THE INVENTION

In view of the background of the prior art described above, the object of the present invention is, accordingly, to provide a sheet-like material having soft texture, durability capable of withstanding practical use, and abrasion resistance, particularly preferably a napped sheet-like material.

In order to solve the problems described above, the present invention has the following constituent features:

The sheet-like material of the present invention is a sheet-like material comprising a nonwoven fabric composed of an ultrafine fiber having an average single fiber diameter of 0.3 to 7 μm; and an elastic resin, wherein the elastic resin is a polyurethane resin (D) which contains: as essential constituent monomers, a copolymerized polycarbonate diol (A1) which contains a structural unit derived from C3-5 alkane diol (a1) and a structural unit derived from C8-12 alkane diol (a2), the molar ratio of the alkanediol (a2) with respect to the total number of moles of the alkanediol (a1) and the alkanediol (a2) being 50 to 95 mole %; a polycarbonate diol (A2) containing a structural unit derived from a C4-6 alkane diol (a3); an organic diisocyanate (B); and a chain extender (C), and the polyurethane resin (D) satisfies the following conditions (1) to (3):

(1) The copolymerized polycarbonate diol (A1) has a heat quantity of fusion (ΔH) of 40 to 100 J/g, the heat quantity of fusion (ΔH) being determined in accordance with a melting point measuring method provided in JIS K7121-1987.
(2) The polycarbonate diol (A2) has a heat quantity of fusion (ΔH) of 0 J/g.
(3) A difference (ΔTm) in a melting point (Tm) between a mixture (A12) of the copolymerized polycarbonate diol (A1) with the polycarbonate diol (A2) and the copolymerized polycarbonate diol (A1) is 1.5° C. or lower, the melting point (Tm) being determined by a melting point measuring method provided in JIS K7121-1987.

According to a preferable embodiment of the sheet-like material of the present invention, the mixture (A12) of the copolymerized polycarbonate diol (A1) with the polycarbonate diol (A2) has a heat quantity of fusion (ΔH) of 10 to 55 J/g.

According to a preferable embodiment of the sheet-like material of the present invention, the alkanediol (a1) is a linear alkanediol and the alkanediol (a2) is a linear alkanediol.

According to a preferable embodiment of the sheet-like material of the present invention, a mass ratio of the copolymerized polycarbonate diol (A1) with respect to the total mass of the copolymerized polycarbonate diol (A1) and the polycarbonate diol (A2) is 30 to 80 mass %.

According to a preferable embodiment of the sheet-like material of the present invention, at least one of the alkanediol (a1) and the alkanediol (a2) is a bio-based alkanediol.

According to a preferable embodiment of the sheet-like material of the present invention, the polyurethane resin (D) is a polyurethane resin (D1) containing, as an essential constituent monomer, a compound (A3) having a hydrophilic group and an active hydrogen.

According to the present invention, a sheet-like material having soft texture, durability capable of withstanding practical use, and abrasion resistance can be obtained, particularly preferably a napped sheet-like material can be obtained.

DETAILED DESCRIPTION OF EMBODIMENTS OF THE INVENTION

The sheet-like material of the present invention is a sheet-like material containing a nonwoven fabric composed of ultrafine fibers having an average single fiber diameter of 0.3 to 7 μm and an elastic resin.

As a material (raw material) of the ultrafine fiber forming the nonwoven fabric, it is possible to use polyesters such as polyethylene terephthalate, polybutylene terephthalate, polytrimethylene terephthalate, and polylactic acid, polyamides such as 6-nylon and 66-nylon, and thermoplastic resins capable of melt-spinning. It is especially a preferable embodiment that the polyester is used in terms of the strength, dimensional stability, and light resistance. The nonwoven fabric may be mixed with ultrafine fibers of different materials.

The cross-sectional shape of the fiber may be a circular cross-section, and may be elliptical, plane, or polygonal such as triangle. A modified cross-section such as a sector or cruciform may also be used.

It is important that the ultrafine fiber, forming the nonwoven fabric, has an average single fiber diameter of 7 μm or less, in terms of the softness and the nap appearance of the sheet-like material. The average single fiber diameter is preferably 6 μm or less, more preferably 5 μm or less. On the other hand, it is important that the average single fiber diameter is 0.3 μm or more, in terms of the chromogenic property after dying, the dispersibility of fiber bundles during buffing, and the easy handling. The average single fiber diameter is preferably 0.7 μm or more, more preferably 1 μm or more.

The average single fiber diameter herein refers to a value obtained by cutting the obtained the sheet-like material in a thickness direction, observing the cross-section with a scanning electron microscope (SEM), measuring a fiber diameter of 50 arbitrary ultrafine fibers at 3 points, and calculating an average value of fiber diameters of a total of 150 fiber diameters.

As the nonwoven fabric, it is possible to use a fabric in which single fibers in the ultrafine fibers are entangled with each other, and a fabric in which fiber bundles of the ultrafine fibers are entangled. The nonwoven fabric in which the fiber bundles of the ultrafine fibers are entangled is preferably used, in terms of the strength and the texture of the sheet-like material. A nonwoven fabric having appropriate voids between the ultrafine fibers inside the fiber bundle is particularly preferably used, in terms of the softness and the texture.

The nonwoven fabric in which the fiber bundles of the ultrafine fibers are entangled, as described above, can be obtained by, for example, previously entangling the ultrafine fiber-generating fibers, and then generating the ultrafine fibers. The fabric having appropriate voids between the ultrafine fibers inside the fiber bundle can be obtained using islands-in-the-sea fibers, which can provide appropriate voids between the island components, i.e., between the ultrafine fibers inside the fiber bundle, by removing the sea component.

As the nonwoven fabric, both of a staple fiber nonwoven fabric and a filament fiber nonwoven fabric can be used, and the staple fiber nonwoven fabric is preferably used in terms of the texture and the appearance.

The staple fiber in the staple fiber nonwoven fabric has preferably a fiber length of 25 to 90 mm. When the fiber length is adjusted to 25 mm or more, the sheet-like material having the excellent abrasion resistance can be obtained by entanglement. When the fiber length is adjusted to 90 mm or less, the sheet-like material having more excellent texture and appearance can be obtained.

When the ultrafine fibers or the fiber bundles thereof form the nonwoven fabric, a woven fabric or a knitted fabric may be inserted into the fabric, in order to improve the internal strength. Single fibers, forming the woven fabric or the knitted fabric used, have preferably an average single fiber diameter of about 0.3 to 10 μm.

As a material of a fiber forming the woven fabric or the knitted fabric, it is possible to use polyesters such as polyethylene terephthalate, polybutylene terephthalate, polytrimethylene terephthalate, and polylactic acid, polyamides such as 6-nylon and 66-nylon, cellulose-based polymers, and natural fibers such as cotton and hemp, and the like.

The elastic resin in the present invention is a polyurethane resin (D). The polyurethane resin (D) contains, as essential constituent monomers, a copolymerized polycarbonate diol (A1), a polycarbonate diol (A2), an organic diisocyanate (B), and a chain extender (C).

The copolymerized polycarbonate diol (A1) is a copolymerized polycarbonate diol containing structural units derived from a C3-5 alkane diol (a1) and structural units derived from a C8-12 alkane diol (a2), wherein a molar ratio of the alkanediol (a2) with respect to the total number of moles of the alkanediol (a1) and the alkanediol (a2) is 50 to 95 mole %, the copolymerized polycarbonate diol (A1) having a heat quantity of fusion ($\Delta H$), determined by a melting point measuring method provided in JIS K7121-1987, of 40 to 100 J/g.

The molar ratio of the alkanediol (a2) with respect to the total number of moles of the alkanediol (a1) and the alkanediol (a2) is 50 to 95 mole %, preferably 55 to 90 mole %, more preferably 60 to 85 mole %. When the molar ratio of the alkanediol (a2) is more than 95 mole %, the crystallinity of the polyurethane resin is too high, thus resulting in the poor texture of the sheet-like material. When the molar ratio of the alkanediol (a2) is less than 50 mole %, the crystallinity of the polyurethane resin is lost and the abrasion resistance of the sheet-like material is reduced.

The alkanediol (a1) and the alkanediol (a2) may be one kind or multiple kinds. The alkanediol (a1) and the alkanediol (a2) may be a linear alkanediol or a branched alkanediol, and the linear alkanediol is preferably used in terms of the chemical resistance, the low temperature behavior, and the durability.

When the alkanediol (a1) and the alkanediol (a2) are branched alkanediol, the number of branch points of a carbon chain is preferably 1, in terms of the chemical resistance, the low temperature behavior, and the durability. In the diol having the branched chain, when the number of carbon atoms is smaller, the chemical resistance, low temperature behavior, and heat resistance are better, and the number of carbon atoms is preferably 2 or less, more preferably 1 or less.

The alkanediol (a1) has 3 to 5 carbon atoms. When the number of carbon atoms is 2 or less, the handling may not be easy, and when the number of carbon atoms is 6 or more, the durability and the mechanical strength are impaired. The number of carbon atoms in the alkanediol (a1) is preferably 3 or 4, because it is easily obtained.

The alkanediol (a1) may include, for example, 1,3-propanediol, 1,2-propanediol, 2-methyl-1,3-propanediol, 1,3-butanediol, 1,4-butanediol, 2-methyl-1,4-butanediol, 1,5-pentanediol, and the like. 1,3-Propanediol, 1,4-butanediol, and 1,5-pentanediol are preferable, and 1,4-butanediol is more preferable.

The alkanediol (a2) has 8 to 12 carbon atoms. When the number of carbon atoms is 7 or less, the crystallinity of the copolymerized polycarbonate diol (A1) is, high and thus the texture of the sheet-like material is hard. When the number of carbon atoms is 13 or more, the crystallinity of the copolymerized polycarbonate diol (A1) is too low, and the durability and the abrasion resistance of the sheet-like material are impaired.

The number of carbon atoms of the alkanediol (a2) is preferably 8, 10, and 12, because it is easily obtained. The alkanediol (a2) may include 5-methyl-2,4-heptanediol, 2-methyl-1,7-heptanediol, 1,8-octanediol, 2-methyl-1,8-octanediol, 1,9-nonanediol, 1,10-decanediol, 1,11undecanediol, 1,12-dodecanediol, and the like. 1,8-Octanediol, 1,9-nonanediol, 1,10-decanediol, 1,11-undecanediol, and 1,12-dodecanediol are more preferable, 1,9-nonanediol, 1,10-decanediol, and 1,12-dodecanediol are still more preferable, and 1,10-decanediol is particularly preferable.

Bio-based alkanediol (a1) and alkanediol (a2) are preferable embodiments in terms of the environmental loading reduction. The bio-based alkanediol (a1) may include 1,3-propanediol, 1,4-butanediol, 1,5-propanediol, and the like. The bio-based alkanediol (a2) may include 1,9-nonanediol, 1,10-decanediol, 1,11-undecanediol, 1,12-dodecanediol, 1,13-tridecanediol, 1,12-octadecanediol, and the like.

The bio-based alkanediol (a1) and alkanediol (a2) encompass all of alkanediols produced by production methods described below.

For example, when 1,4-butanediol is produced, it may be produced by a chemical synthesis from succinic acid, succinic anhydride, succinate ester, maleic acid, maleic anhydride, maleate ester, tetrahydrofuran, or γ-butyrolactone, which are obtained by a fermentation process, or it may be produced directly by a fermentation process. 1,4-Butanediol may also be produced from 1,3-butadiene obtained by a fermentation process. Of these, the method in which 1,4-butanediol is directly produced by the fermentation process and a method in which succinic acid is hydrogenated by using a reducing catalyst to obtain 1,4-butanediol are efficient and preferable.

In a case of 1,3-propanediol, it can be produced by producing 3-hydroxypropionaldehyde from glycerol, glucose, or another saccharide by a fermentation process, and then converting it into 1,3-propanediol, or can be directly produced from glucose or another saccharide by a fermentation process.

1,10-Decanediol can be synthesized in a method in which sebacic acid is synthesized from castor oil by alkali fusion, and then hydrogenation is performed directly or after an esterification reaction.

A ratio of the bio-based component can be obtained as a theoretical value by performing a radiocarbon (C14) concentration analysis in accordance with a bio-base concentration test standard provided in ASTM D6866 to obtain a ratio of bio-based carbons and fossil fuel-based carbons, and performing calculation.

The copolymerized polycarbonate diol (A1) is crystalline, which can be expressed with a heat quantity of fusion ($\Delta H$) of a melting peak, obtained by a melting point measuring method using a differential scanning calorimetry provided in JIS K7121-1987. The heat quantity of fusion is 40 to 100 J/g, preferably 45 to 90 J/g, more preferably 50 to 75 J/g. When the heat quantity of fusion ($\Delta H$) is less than 40 J/g, the durability and the abrasion resistance are impaired, and when it is more than 100 J/g, the texture is impaired.

The polycarbonate diol (A2) used in the present invention is a polycarbonate diol containing structural units derived from a C4-6 alkane diol (a3), and having a heat quantity of fusion ($\Delta H$), provided as above, of 0 J/g. The polycarbonate diol (A2) may be a copolymer or may not be a copolymer, and the copolymer is preferable.

The alkanediol (a3) has 4 to 6 carbon atoms. When the number of carbon atoms is 3 or less, the crystallinity of the polycarbonate diol (A2) is high, and thus the texture of the sheet-like material is hard. When the number of carbon atoms is 7 or more, the crystallinity of the copolymerized polycarbonate diol (A2) is too low, and thus the durability and the abrasion resistance of the sheet-like material are impaired. The alkanediol (a3) may be one kind or multiple kinds.

The C4-6 alkanediol may include 1,4-butanediol, 1,5-pentanediol, 2-methyl-1,3-propanediol, neopentyl glycol, 1,6-hexanediol, 3-methyl-1,5pentanediol, and mixed diols of two or more kinds thereof. 1,4-butanediol, 1,5-pentanediol, 1,6-hexanediol, 3-methyl-1,5pentanediol, and mixed diols of two or more kinds thereof are more preferable. The most preferable alkanediols are 1,6-hexanediol, 3-methyl-1,5pentanediol, and mixed diols thereof.

The polycarbonate diol (A2) is amorphous, which can be confirmed by observation of no melting peak in a melting point measuring method using a differential scanning calorimetry provided in JIS K7121-1987. When the polycarbonate diol (A2) is crystalline, the texture of the sheet-like material may be impaired.

A ratio of the copolymerized polycarbonate diol (A1) and the polycarbonate diol (A2) is a ratio which does not hinder the crystallization of the copolymerized polycarbonate diol (A1) and defined as a ratio of the amorphous polycarbonate diol (A2). Specifically, a difference ($\Delta Tm$) in the melting point (Tm), which is determined by a melting point measuring method provided in JIS K7121-1987, between the copolymerized polycarbonate diol (A1) and the mixture (A12) of the copolymerized polycarbonate diol (A1) with the polycarbonate diol (A2) is 1.5° C. or lower, preferably 1.0° C. or lower, more preferably 0.8° C. or lower. When the difference ($\Delta Tm$) in the melting point (Tm) is higher than 1.5° C., the durability and the abrasion resistance are impaired.

The ratio of the copolymerized polycarbonate diol (A1) to the polycarbonate diol (A2) is preferable with in a range in which the mixture (A12) of the copolymerized polycarbonate diol (A1) with the polycarbonate diol (A2) has a heat quantity of fusion ($\Delta H$) of 10 to 55 J/g, in terms of the texture, the durability, and the abrasion resistance. The range is more preferably 20 to 50 J/g, still more preferably 25 to 45 J/g.

A molar ratio of the copolymerized polycarbonate diol (A1) with respect to the total number of moles of the copolymerized polycarbonate diol (A1) and the polycarbonate diol (A2) is preferably 30 to 80 mole %, more preferably 40 to 70 mole %. When the molar ratio of the copolymerized polycarbonate diol (A1) is 30 mole % or more, the durability of the sheet-like material is good, and when it is 80 mole % or less, the texture of the sheet-like material is good.

It is preferable that the copolymerized polycarbonate diol (A1) and the polycarbonate diol (A2) has a number-average molecular weight of 500 or more, more preferably 700 or more, still more preferably 1000 or more, in terms of the texture. In terms of the strength, the number-average molecular weight is preferably 5000 or less, more preferably 4500 or less, still more preferably 4000 or less.

The number-average molecular weight of the copolymerized polycarbonate diol (A1) or the polycarbonate diol (A2) can be obtained from a hydroxyl value. The hydroxyl value is measured in accordance with a method provided in JIS K 0070-1992 (a potential-difference titrating method).

A method for producing the copolymerized polycarbonate diol (A1) or the polycarbonate diol (A2) may include, for example, a transesterification of a carbonate such as diphenyl carbonate or dimethyl carbonate with a diol. In detail, the method may include various methods described in, for example, USP 4013702, U.S. Pat. No. 4,105,641, and Polymer Reviews written by Schnell, vol. 9, pages 9-20 (1964). USP 4013702 and USP 4105641 describe the synthesis of copolymerized polycarbonate diols of 1,6-hexanediol with 1,4-butanediol. All of them disclose the method for producing the copolymerized polycarbonate diol.

Examples of the copolymerized polycarbonate diol (A1) may include 1,8-octanediol/1,3-propanediol copolymerized polycarbonate diol, 1,8-octanediol/1,4-butanediol copolymerized polycarbonate diol, 1,8-octanediol/1,5-pentanediol copolymerized polycarbonate diol, 1,9-nonanediol/1,3-propanediol copolymerized polycarbonate dial, 1,9-nonanediol/1,4-butanediol copolymerized polycarbonate diol, 1,9-nonanediol/1,5-pentanedial copolymerized polycarbonate dial, 1,10-decanediol/1,3-propanediol copolymerized polycarbonate diol, 1,10-decanediol/1,4-butanediol copolymerized polycarbonate diol, 1,10-decanediol/1,5-pentanediol copolymerized polycarbonate diol, 1,12-dodecanediol/1,3-propanediol copolymerized polycarbonate diol, 1,12-dodecanediol/1,4-butanediol copolymerized polycarbonate diol, 1,12-dodecanediol/1,5-pentanediol copolymerized polycarbonate diol, and mixed copolymerized polycarbonate dials of two or more kinds thereof.

Of these, the preferable copolymerized polycarbonate dials (A1) are 1,8-octanediol/1,4-butanediol copolymerized polycarbonate diol, 1,9-nonanediol/1,4-butanediol copolymerized polycarbonate diol, 1,10-decanediol/1,4-butanediol copolymerized polycarbonate diol, 1,12-dodecanediol/1,4-butanediol copolymerized polycarbonate diol, and mixed copolymerized polycarbonate dials of two or more kinds thereof. The particularly preferable copolymerized polycarbonate diol (A1) is 1,10-decanediol/1,4-butanediol copolymerized polycarbonate diol.

Examples of a homopolymer of the polycarbonate diol (A2) may include 2-methyl-1,3-propanediol polycarbonate diol, neopentyl glycol polycarbonate diol, 2-ethyl-1,3-propanediol polycarbonate diol, 3-methyl-1,5-pentanediol polycarbonate diol, and mixed polycarbonate diols of two or more kinds thereof.

Examples of a copolymer may include 1,4-butanediol/1,5-pentanediol copolymerized polycarbonate diol, 1,4-butanediol/1,6-hexanediol copolymerized polycarbonate diol, 1,5-pentanediol/1,6-hexanediol copolymerized polycarbonate dial, 2-methyl-1,3-propanediol/1,6-hexanediol copolymerized polycarbonate diol, neopentyl glycol/1,6-hexanediol copolymerized polycarbonate diol, 3-methyl-1,5-pentanediol/1,6-hexanediol copolymerized polycarbonate diol, 2-ethyl-1,3-propanediol/1,6-hexanediol copolymerized polycarbonate diol, and mixed copolymerized polycarbonate diols of two or more kinds thereof.

Of these, the preferable polycarbonate diols (A2) are 1,5-pentanediol/1,6-hexanediol copolymerized polycarbonate diol, neopentyl glycol/1,6-hexanediol copolymerized polycarbonate diol, 2-ethyl-1,3-propanediol/1,6-hexanediol copolymerized polycarbonate diol, 3-methyl-1,5-pentanediol/1,6-hexanediol copolymerized polycarbonate diol, and mixed copolymerized polycarbonate diols of two or more kinds thereof, and particularly preferably, 3-methyl-1,5-pentanediol/1,6-hexanediol copolymerized polycarbonate diol.

As the diol component of the polyurethane resin (D) used in the present invention, another polymer diol (A3) may be used in addition to the copolymerized polycarbonate diol (A1) and the polycarbonate diol (A2) within a range so that the properties are not adversely affected. The other polymer diol (A3) may be used in an amount of, preferably 0 to 40 mass %, more preferably 5 to 35 mass %, with respect to the total mass of the copolymerized polycarbonate diol (A1) and the polycarbonate diol (A2).

The polymer diol (A3) may include polyether dials and polyester diols having a number-average molecular weight of preferably 500 to 5,000, more preferably 1,000 to 4,000.

The polyether diol may include, for example, compounds having a structure in which an alkylene oxide (hereinafter which may sometimes be referred to as "AO") is added to a low molecular weight diol, and mixtures of two or more kinds thereof.

The low molecular weight diol may include ethylene glycol, diethylene glycol, propylene glycol, 1,4-butanediol, 1,3-butanediol, neopentyl glycol, 1,6-hexanediol, 3-methyl-1,5-pentanediol; low molecular weight diols having a ring structure [bis(hydroxymethyl)cyclohexane, bis(hydroxyethyl)benzene, ethylene oxide adduct of bisphenol A, and the like], and mixtures of two or more kinds thereof.

AO may include ethylene oxide (hereinafter which may sometimes be referred to as "EO"), propylene oxide (hereinafter which may sometimes be referred to as "PO"), tetrahydrofuran (hereinafter which may sometimes be referred to as "THF"), 3-methyl-tetrahydrofuran (hereinafter which may sometimes be referred to as "3-M-THF"), and the like.

AO may be used alone or as a mixture of two or more kinds. In the latter case, they may be used as a block-addition product, random-addition product, or a mixture thereof. Among them, the preferable AO is EO alone, PO alone, THF alone, 3-M-THF alone, mixtures of PO and EO, mixtures PO and/or EO with THF, or mixtures of THF and 3-M-THF (when they are used as a mixture, they are used in a random, block, or mixture system).

Concrete examples of the polyether diol may include polyethylene glycol, polypropylene glycol, polytetramethylene ether glycol (hereinafter refers to as "PTMG"), poly-3-methyl-tetramethylene ether glycol, THF/EO copolymerized diol, THF/3-M-THF copolymerized diol, and the like. Of these, PTMG is preferable.

The addition of AO to the low molecular weight diol can be performed in a usual method, which is performed in the presence or absence of a catalyst (an alkali catalyst, an amine-based catalyst, or an acid catalyst) (in particular, at a later stage of the AO addition) under a normal pressure or an increased pressure in one stage or multiple stages.

The polyester diol may include polyester diols obtained by reaction of a low molecular weight diol and/or a polyether diol having a molecular weight of 1000 or less with a dicarboxylic acid, or polylactone diols obtained by ring-opening polymerization of a lactone.

The low molecular weight diol may include ethylene glycol, diethylene glycol, propylene glycol, 1,4-butanediol, 1,3-butanediol, neopentyl glycol, 1,6-hexanediol, 3-methyl-1,5-pentanediol; low molecular weight diols having a ring structure [bis(hydroxymethyl)cyclohexane, bis(hydroxyethyl)benzene, ethylene oxide addition products of bisphenol A, and the like], and mixture of two or more kinds thereof.

The dicarboxylic acid may include aliphatic dicarboxylic acids (succinic acid, adipic acid, azelaic acid, sebacic acid, and the like), aromatic dicarboxylic acids (terephthalic acid, isophthalic acid, phthalic acid, and the like) derivatives capable of forming esters of these dicarboxylic acids [acid anhydride, lower alkyl (the number of carbon atoms of 1-4) ester, and the like], and mixtures of two or more kinds thereof. The lactone may include ε-caprolactone, γ-butyrolactone, γ-valerolactone, and mixtures of two or more kinds thereof.

The polyesterification may be performed in a usual method, for example, a low molecular weight diol is reacted (condensed) with a dicarboxylic acid, or a lactone is added to an initiator (a low molecular weight diol) whereby the polyester can be produced.

Concrete examples of the polyester diol may include polyethylene adipate diol, polybutylene adipate diol, polyneopentyl adipate diol, polyhexamethylene adipate diol, polyethylene butylene adipate diol, polydiethylene adipate diol, polybutylene sebacate diol, polycaprolactone diol, and the like.

The organic diisocyanate (B) may include C6-20 (excluding a carbon atom in NCO group, hereinafter the same) aromatic diisocyanates, C2-18 aliphatic diisocyanates, C4-15 alicyclic diisocyanates, C8-15 aromatic-aliphatic diisocyanates, modified diisocyanates thereof (diisocyanates modified with carbodiimide, urethane, uretdione, or the like), mixtures of two or more kinds thereof, and the like.

Concrete examples of the aromatic diisocyanate may include 1,3- and/or 1,4-phenylene diisocyanate, 2,4- and/or 2,6-tolylene diisocyanate, 2,4'- and/or 4,4'-diphenylmethane diisocyanate (hereinafter referred to as "MDI"), 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, and the like Concrete examples of the aliphatic diisocyanate may include ethylene diisocyanate, tetramethylene diisocyanate, hexamethylene diisocyanate, dodecamethylene diisocyanate, 2,2,4-trimethylhexamethylene diisocyanate, lysine diisocyanate, 2,6-diisocyanatomethylcaproate, bis(2-isocyanatoethyl)carbonate, 2-isocyanatoethyl-2,6-diisocyanatohexanoate, and the like.

Concrete examples of the alicyclic diisocyanate may include isophorone diisocyanate, dicyclohexylmethane-4,4'-diisocyanate, cyclohexylene diisocyanate, methylcyclohexylene diisocyanate, bis(2-isocyanatoethyl)-4-cyclohexylene-1,2-dicarboxylate, 2,5- and/or 2,6-norbornane diisocyanate, and the like.

Concrete examples of the aromatic-aliphatic diisocyanate may include m- and/or p-xylene diisocyanate, α,α,α',α'-tetramethylxylylene diisocyanate, and the like.

Of these, the aromatic diisocyanates are preferable, and MDI is particularly preferable.

The chain extender (C) may include water, low molecular weight diols (for example, ethylene glycol, propylene glycol, 1,3-butylene glycol, 1,4-butanediol, 1,6-hexanediol, diethylene glycol, neopentyl glycol, and the like), alicyclic diols [1,4-bis(hydroxymethyl)cyclohexane, and the like], aromatic diols [1,4-bis(hydroxyethyl)benzene, and the like], aliphatic diamines (ethylene diamine, and the like), alicyclic diamines (isophorone diamine, and the like), aromatic diamines (4,4-diaminodiphenyl methane, and the like), aromatic-aliphatic diamines (xylene diamine, and the like), alkanol amines (ethanol amine, and the like), hydrazine, dihydrazide (adipic acid dihydrazide, and the like), and mixtures of two or more kinds thereof. Of these, the preferable chain extenders (C) are water, low molecular weight diols, and aromatic diamines, more preferably water, ethylene glycol, 1,4-butanediol, 4,4'-diaminodiphenyl methane, mixtures of two or more kinds thereof.

The chain extender (C) described above has preferably a number-average molecular weight of 250 or less.

The polyurethane resin (D), used in the present invention, has preferably a ratio of the organic diisocyanate (B) of, as an equivalent ratio, 0.95 or more and 1.1 or less, more preferably 0.97 or more and 1.05 or less, with respect to the total amount of active hydrogen groups in the copolymerized polycarbonate diol (A1), the polycarbonate diol (A2), and the chain extender (C), because the produced polyurethane resin has a high degree of polymerization.

A ratio of the number of active hydrogen groups in the chain extender (C) is preferably 0.2 or more and 10 or less, more preferably 0.5 or more and 0.5 or less, with respect to the total number of the active hydrogen groups in the copolymerized polycarbonate diol (A1) and the polycarbonate diol (A2).

Production of the polyurethane resin (D) used in the present invention may preferably include, for example, a one-shot method in which the polymer diol (A), the organic diisocyanate (B), and the chain extender (C) are reacted at the same time, a prepolymer method in which the polymer diol (A) and the organic diisocyanate (B) are previously reacted to obtain a urethane prepolymer, and then the chain extender (C) is reacted therewith, and the like.

The reaction temperature in the polyurethanation is preferably 20 to 160° C., more preferably 40 to 80° C. If necessary, a polymerization terminator, such as a monoalcohol (methanol, ethanol, butanol, cyclohexanol, and the like), monoamine (diethyl amine, dibutyl amine, cyclohexyl amine and the like), may be used.

In order to promote the reaction, if necessary, a catalyst, which is preferably used in the polyurethane reaction, may be used, [for example, amine-based catalysts (triethylamine, triethylene diamine, and the like), tin-based catalysts (dibutyltin dilaurate, dioctyltin dilaurate, and the like), and the like]. The catalyst is used in an amount of preferably 1 mass % or less with respect to the polyurethane resin.

The production of the polyurethane resin (D) used in the present invention is performed in the presence or absence of an organic solvent. When the production is performed in the absence of the organic solvent, it is possible that the organic solvent is added later, or a solid resin is once produced and then it is dissolved in a solvent.

The organic solvent (G) used in the production of the polyurethane resin (D) may include, for example, amide-based solvents [N,N-dimethylformamide (hereinafter which may sometimes be referred to as "DMF"), N,N-dimethyl acetamide, N-methyl pyrrolidone, and the like]; sulfoxide-based solvents [dimethyl sulfoxide (hereinafter which may sometimes be referred to as "DMSO"), and the like]; ketone-based solvents (methyl ethyl ketone, and the like); ether-based solvents (dioxane, THF, and the like); ester-based solvents (methyl acetate, ethyl acetate, butyl acetate, and the like); aromatic solvents (toluene, xylene, and the like), and mixtures of two or more kinds thereof. Of these, the preferable organic solvents are the amide-based solvents, and particularly preferable organic solvent is DMF.

To the polyurethane resin (D) may be added, if necessary, a coloring agent such as titanium oxide, various stabilizers such as a ultraviolet absorber (a benzophenone-based or benzotriazole-based absorber, or the like), or an antioxidant [a hindered phenol such as 4,4-butylidene-bis(3-methyl-6-1-butyl phenol); an organic phosphite such as triphenyl phosphite, or trichloroethyl phosphite, and the like], an inorganic filler (calcium carbonate, and the like), or a known coagulation modifier [a higher alcohol; cetyl alcohol, stearyl alcohol, and the like (Japanese Patent Examined Publication No. Sho 42-22719), a crystalline organic compound; purified octadecyl alcohol, purified stearyl alcohol, and the like (Japanese Patent Examined Publication No. Sho 56-41652), a hydrophobic nonion surfactant; sorbitan monostearate, sorbitan palmitate, and the like (Japanese Patent Examined Publication Nos. Sho 45-39634 and Sho 45-39635)], and the like. The additives may be added in a total amount (a content) of 10 weight % or less, more preferably 0.5 to 5 weight %, with respect to the polyurethane resin (D).

The polyurethane resin (D) used in the present invention has preferably a coagulation value of 2 ml or more, more preferably 2.3 ml or more, still more preferably 2.5 ml or more, in terms of the coagulation speed. The coagulation value is also preferably 5 ml or less, more preferably 4.7 ml or less, still more preferably 4.5 ml or less.

The coagulation value is determined by preparing a 1 mass % DMF solution including a polyurethane resin, and adding water having a temperature of 25° C. to 100 g of the solution above while the temperature is maintained at 25° C. and the solution is stirred with a stirrer. The coagulation value refers to an amount (ml) of water added dropwise necessary for clouding the solution (which is transparent) at that time.

The coagulation value shows a degree of hydrophilicity of the polyurethane resin, and is an indicator of a coagulation speed of the polyurethane resin when the solution including the polyurethane resin is given to a base material to cause wet coagulation. For example, when a polymer diol having a large hydrophobicity is used, the coagulation value of the polyurethane resin becomes small, and when a polymer diol having a large hydrophilicity is used, the coagulation value of the polyurethane resin becomes large.

The polyurethane resin (D) has a number-average molecular weight of preferably 20,000 or more in terms of the resin strength, and preferably 500,000 or less in terms of the viscosity stability and the workability. The number-average molecular weight is more preferably 30,000 or more and 150,000 or less.

The number-average molecular weight of the polyurethane resin (ID) can be obtained from a gel permeation chromatography, and the measurement is performed, for example, in the following conditions:
 Apparatus: HLC-8220 manufactured by Tosoh
 Column: TSK gel α-M manufactured by Tosoh
 Solvent: DMF
 Temperature: 40° C.
 Calibration: polystyrene <Aqueous Dispersion (P) of Polyurethane Resin>

In the polyurethane resin (ID), the polyurethane resin (D1) further containing a compound (A3) having a hydrophilic group and active hydrogen as an essential constituent monomer is preferably used as a polyurethane resin aqueous dispersion (P) containing the polyurethane resin (D1) and water.

A mass ratio of the compound (A3) having the hydrophilic group and the active hydrogen is preferably 0.5 to 14 mass %, more preferably 0.8 to 10 mass %, particularly preferably 1 to 7 mass %, with respect to the total mass of the copolymerized polycarbonate diol (A1), the polycarbonate diol (A2), and the compound (A3) having the hydrophilic group and the active hydrogen.

In the present invention, the hydrophilic group in the compound (A3) having the hydrophilic group and the active hydrogen refers to a carboxyl group, a carboxylate group, sulfo group, or a sulfonato group. The active hydrogen refers to active hydrogen other than the carboxyl group and sulfo group.

The compound (A3) having the hydrophilic group and the active hydrogen may include, for example, C2-10 compounds having a carboxyl group [dialkylol alkanoic acids (for example, 2,2-dimethylol propionic acid, 2,2-dimethylol butanoic acid, 2,2-dimethylol heptanoic acid, and 2,2-dimethylol octanoic acid), tartaric acid and amino acid (for example, glycine, alanine, and valine), and the like], C2-16 compounds having a sulfo group [3-(2,3-dihydroxypropoxy)-1-propanesulfonic acid, sulfoisophthalic acid di(ethylene glycol) ester, and the like], C2-10 compounds having a sulfamic acid group [N,N-bis(2-hydroxyethyl)sulfamic acid, and the like], salts obtained by neutralization of the compounds above with a neutralizing agent described below.

Of these, the preferable compounds (A3) having the hydrophilic group and the active hydrogen are compounds having the carboxyl group and the carboxylate group, and especially, 2,2-dimethylol propionic acid and 2,2-dimethylol butanoic acid are particularly preferably used.

The total content of the carboxyl groups and the carboxylate groups in the polyurethane resin (D1) is 0.09 to 0.27 mmol/g, more preferably 0.14 to 0.25 mmol/g based on the mass of the polyurethane resin (D), in terms of the stability of the aqueous dispersion and the heat resistance and the weatherability of the obtained film.

In order to adjust the total content of the carboxyl groups and the carboxylate groups in the polyurethane resin (D1) to a range of 0.09 to 0.27 mmol/g, for example, when 2,2-dimethylol propionic acid is used as the compound (A3) having the hydrophilic group and the active hydrogen, it is preferable that the polyurethane resin (D) is synthesized so that the mass ratio of the compound (A3) having the hydrophilic group and the active hydrogen is about 1.0 to 10.0 mass % with respect to the total mass of the copolymerized polycarbonate diol (A1), the polycarbonate diol (A2), and the compound (A3) having the hydrophilic group and the active hydrogen.

The total content of the carboxyl groups and the carboxylate groups in the polyurethane resin in the present invention can be calculated from an acid value obtained by heat-drying 3 to 10 g of an aqueous dispersion (P) of the polyurethane resin at a temperature of 130° C. for 45 minutes to obtain a residue, washing the residue with water, heat-drying it at a temperature of 130° C. for 45 minutes again, dissolving the resulting product in dimethyl formamide, and performing a measurement by a method (potentiometric titration) described in JIS K 0070:1992.

The neutralizing agent used for obtaining a neutralized salt of the compound (A3) having the hydrophilic group and the active hydrogen may include, for example, ammonia, C1-20 amine compounds, and hydroxides of an alkali metal (sodium, potassium, lithium, and the like).

The C1-20 amine compounds may include primary amines such as monomethyl amine, monoethyl amine, monobutyl amine, monoethanol amine, and 2-amino-2-methyl-1-propanol, secondary amines such as dimethyl amine, diethyl amine, dibutyl amine, diethanol amine, and N-methyl-diethanol amine, and tertiary amines such as trimethyl amine, triethyl amine, dimethylethyl amine, and triethanol amine. Of these, the preferable amine compounds are compounds having a low vapor pressure at a temperature of 25° C., from the odor of the aqueous dispersion and the water resistance of the obtained film, and the more preferably amine compounds are triethyl amine, monoethanol amine, diethanol amine, and N-methyldiethanol amine.

The aqueous dispersion (P) of the polyurethane resin contains the polyurethane resin (D1) and water, and may contain, if necessary, a surfactant (E), a cross-linking agent (F), and a weatherproof stabilizer.

The surfactant (E) may include non-ionic surfactants, anionic surfactants, cationic surfactants, ampholytic surfactants, and other emulsion dispersants. They may be used alone or as a mixture of two or more kinds.

The content of the surfactant (E) is preferably 0 to 20 mass %, more preferably 0.1 to 10 mass %, particularly preferably 0.2 to 5 mass % based on the mass of the polyurethane resin (D) in terms of the water resistance of the dried film.

The cross-linking agent (F) refers to a water-soluble or water-dispersible compounds having two or more functional groups capable of reacting with a carboxyl group in the polyurethane backbone in its molecule. The functional group capable of reacting with the carboxyl group may include a carbodiimide group, an oxazoline group, an epoxy group, a cyclocarbonate group, aziridine group, and the like.

The cross-linking agent (F) may be used alone or as a mixture of two or more kinds. The cross-linking agent is used in an amount of preferably 1.0 to 20 mass %, more preferably 1.5 to 10 mass %, based on the mass of the polyurethane resin (D).

The weatherproof stabilizer may include antioxidants, (hindered phenol-based, sulfur-based, and phosphorus-based antioxidants, and the like), UV absorbers (benzotriazole-based, triazine-based, benzophenone-based, and benzoate-based absorbers, and the like), hindered amine-based light stabilizer, and the like. The weatherproof stabilizer is used in an amount of preferably 0.1 to 10 mass %, more preferably 0.2 to 5 mass % based on the mass of the polyurethane resin (D).

The aqueous dispersion (P) of the polyurethane resin has a volume average particle size of preferably 0.01 to 1 μm, more preferably 0.02 to 0.7 μm, particularly preferably 0.03 to 0.5 μm, in terms of the storage stability and the viscosity.

The aqueous dispersion (P) used in the present invention has a solid concentration of preferably 20 to 70 mass %, more preferably 30 to 60 mass %.

<Method for Producing Water Dispersion (P) of Polyurethane Resin>

The method for producing the aqueous dispersion (P) of the polyurethane resin may include, for example, methods [1] and [2] described below.

Method in which a copolymerized polycarbonate diol (A1), a polycarbonate diol (A2), a compound (A3) having the hydrophilic group and the active hydrogen, and an aliphatic polyisocyanate (B), and if necessary an organic solvent are charged, a urethane prepolymer is formed in one stage or multiple stages, then hydrophilic groups, introduced from the compound (A3) having the hydrophilic group and the active hydrogen, are neutralized with a neutralizing agent, then the resulting product is dispersed in an aqueous medium in the presence of an organic solvent and a chain extender (C), and if necessary a reaction terminator, the reaction is continued until isocyanate groups substantially disappear, and the organic solvent is distilled away.

In the production method [1] described above, when the chain elongation is performed using the chain extender (C) and, if necessary, the chain elongation is stopped, it is a preferable embodiment that the prepolymer is dispersed in the aqueous medium, and then the chain extender (C) and, if necessary, the reaction terminator are added thereto, in terms of the stability of the aqueous dispersion.

Method in which a copolymerized polycarbonate diol (A1), a polycarbonate diol (A2), a compound (A3) having the hydrophilic group and the active hydrogen and an aliphatic polyisocyanate (B), and if necessary an organic solvent are charged, a polyurethane resin (D) is formed in one stage or multiple stages, hydrophilic groups, introduced from the compound (A3) having the hydrophilic group and the active hydrogen, are neutralized with a neutralizing agent, then the resulting product is dispersed in an aqueous medium in the presence or absence of an organic solvent, and if necessary the organic solvent is distilled away.

The prepolymer is formed by reacting the isocyanate groups/active hydrogen-containing groups in an equivalent ratio of, usually, 1.01 to 2.0. The prepolymer is formed at a temperature of usually 20° C. to 150° C., preferably 60° C. to 110° C., and the reaction time is usually 2 to 15 hours. The prepolymer can be formed in the presence or absence of an organic solvent which cannot be substantially reacted with isocyanate groups. After the reaction, the prepolymer has usually a free isocyanate group content of 0.5 to 5%.

The organic solvent used in the reaction described above may include solvents which has a boiling point of lower than 100° C. and cannot be substantially reacted with an isocyanate group (for example, ketones such as ethyl methyl ketone and acetone, esters such as methyl acetate and ethyl acetate, acetonitrile, tetrahydrofuran, and the like). When an organic solvent having a boiling point of higher than 100° C. is used, it is difficult to completely remove the organic solvent alone, it remains in the aqueous dispersion, and the organic solvent is generated during processing. In addition, the organic solvent easily remains in the obtained film, and thus the film properties are changed with time.

In the urethanation reaction, in order to promote the reaction, a catalyst, which is used in a usual urethanation reaction if necessary, can be used. The catalyst may include amine catalysts, for example, triethylamine, N-ethyl morpholine, triethylene diamine, and cycloamidines described in U.S. Pat No. 4,524,104 [1,8-diaza-bicyclo(5,4,0)undecene-7 (DBU manufactured by San-Apro Ltd.), and the like]; tin-based catalysts, for example, dibutyltin dilaurate, dioctyltin dilaurate, and tin octylate; titanium-based catalysts, such as tetrabutyl titanate; bismuth-based catalysts, for example, bismuth trioctylate; and the like.

Next, a method for producing the sheet-like material of the present invention is stated.

As a method for obtaining the ultrafine fiber of the present invention, it is possible to use direct spinning or ultrafine fiber-generating fiber, but especially use of the ultrafine fiber-generating fiber is a preferable embodiment. As the ultrafine fiber-generating fiber, an islands-in-the-sea fiber can be adopted which has a sea component and an island component, the components being two thermoplastic resin components having a solubility in a solvent different from each other, the ultrafine fibers of the island component being obtained by dissolving only the sea component in a solvent to remove it; and a releasable composite fiber and a multi-layered composite fiber can also be adopted in which two thermoplastic resin components are disposed alternately in a radial pattern of a fiber cross-section or in a layer pattern, the ultrafine fibers being obtained by releasing and dividing each component to split the composite fiber into ultrafine fibers. The islands-in-the-sea fiber is more preferably used because the product appearance can be uniform.

The sea component in the islands-in-the-sea fiber may include, for example, polyolefins such as polyethylene and polypropylene, polystyrene, copolymerized polyesters such as those copolymerized with sodium sulfoisophthalate, or polyethylene glycol, polylactic acid, polyvinyl alcohol, copolymers thereof, and the like.

The treatment for converting into an ultrafine fiber (treatment for removing the sea component) of the islands-in-the-sea fiber can be performed by immersing the islands-in-the-sea fibers in a solvent and extracting liquid. As the solvent capable of dissolving the sea component, organic solvents such as toluene and trichloroethylene, alkali aqueous solution such as solution containing sodium hydroxide, and hot water can be used.

To perform the treatment for converting into an ultrafine fiber, machines such as a continuous dyeing machine, a vibrowasher-type sea extractor, a jet dyeing machine, a whince dyeing machine, and a jigger dyeing machine can be used.

The solution and removal of the sea component can be performed at either time of before and after providing the elastic polymer. When the treatment for removing the sea component is performed before providing the elastic polymer, the ultrafine fibers can be strongly held, because a structure in which the elastic polymer adheres directly to the ultrafine fiber is created, and thus the abrasion resistance of the sheet-like material is better. On the other hand, when the treatment for removing the sea component is preformed after providing the elastic polymer, voids are generated, resulting from the sea component which is removed, between the elastic polymer and the ultrafine fiber, and thus the elastic polymer does not directly hold the ultrafine fiber and thus the texture of the sheet-like material is soft.

In the islands-in-the-sea fiber used in the present invention, a mass ratio of the sea component to the island component is preferably within a range of the sea component: the island component=10:90 to 80:20. When the mass ratio of the sea component is less than 10 mass %, it is insufficient to convert the island component into ultrafine fibers. When the mass ratio of the sea component is more than 80 mass %, a ratio of an elusion component is high and thus the productivity is low. The mass ratio of the sea component to the island component is more preferably within a range of the sea component: the island component=20:80 to 70:30.

In the present invention, when the ultrafine fiber-generating fiber, represented by the islands-in-the-sea fiber, is drawn, any method can be adopted, undrawn yarn is once wound and then is separately drawn, or Undrawn yarn is taken and is continuously drawn as it is. The drawing can be appropriately performed by a wet-heating method, a dry-heating method, or combination thereof in 1 to 3 stages. Next, the drawn islands-in-the-sea fiber is preferably subjected to a crimping processing, and it is cut in a pre-determined length to obtain a raw stock of the nonwoven fabric. The crimping processing and the cutting processing can be performed in usual methods.

It is preferable that buckling-crimping is provided to the composite fiber used in the present invention. The reason is that the entangling property between the fibers is increased by the buckling-crimping when the staple fiber nonwoven fabric is formed, whereby it is possible to increase the density and to increase the entangling. In order to provide the buckling-crimping to the composite fiber, stuffing box-type crimpers, usually used, are preferably used. In order to obtain a preferable retention coefficient of crimping in the present invention, it is preferable to appropriately control a treatment fineness, a crimper temperature, a crimper weight applied, a precharge pressure, and the like.

The buckled and crimped ultrafine fiber-generating fibers has a retention coefficient of crimping within a range of preferably 3.5 to 15, more preferably 4 to 10. When the retention coefficient of crimping is 3.5 or more, the rigidity in a thickness direction of the nonwoven fabric is increased when the nonwoven fabric is formed, and the entangling property can be maintained in entangling steps such as a needle punching step. When the retention coefficient of crimping is adjusted to 15 or less, the fiber opening property of fiber webs is excellent in carding while the fibers are not crimped too much.

The retention coefficient of crimping herein refers to a value expressed by the following formula:

$$\text{Retention Coefficient of Crimping} = (W/L-L0)1/2$$

wherein

W: an extinction load of crimping (a load at the time at which the crimping is completely elongated: mg/dtex)

L: a fiber length under an extinction load of crimping (cm)

L0: a fiber length under a load of 6 mg/dtex (cm). The marking is made at 30.0 cm.

For measurement, first, a load of 100 mg/dtex is applied to a sample, then the load is increased in units of 10 mg/dtex, and the state of crimping is observed. The load is applied until the crimping is completely elongated, and a length of the marking (an elongation from 30.0 cm) is measured in the state in which the crimping is completely elongated.

The composite fiber used in the present invention has a single fiber fineness within a range of preferably 2 to 10 dtex, more preferably 3 to 9 dtex, in terms of the entangling property in the needle punching step, and the like.

The composite fiber, used in the production of the sheet-like material of the present invention, has a shrinkage of preferably 5 to 40%, more preferably 10 to 35% at a temperature of 98° C. When the shrinkage is adjusted to the range described above, the fiber density can be increased by a hot water treatment, and the fiber is satisfactory like real leather can be obtained.

A method for measuring the shrinkage is specifically a method in which first a load of 50 mg/dtex is applied to bundles of the composite fiber, and marking is made at 30.0 cm (L0). After that, the bundles are treated in a hot water having a temperature of 98° C. for 10 minutes, and a length (L1) after the treatment is measured. From the lengths, (L0−L1)/L0×100 is calculated. The measurement is performed 3 times, and an average value is defined as the shrinkage.

In the present invention, the number of fibers in an ultrafine fiber bundle is preferably 8 to 1000 fibers/bundle, more preferably 10 to 800 fibers/bundle. When the number of fibers is less than 8 fibers/bundle, the compactness of the ultrafine fiber is poor, and for example, mechanical properties such as abrasiveness tends to be reduced. When the number of fibers is more than 19000 fibers/bundle, the fiber opening property is reduced during buffing, and the fiber distribution on the napped surface is not uniform, and good product appearance is not obtained.

As a method for obtaining the nonwoven fabric, which is entangled fibers forming the sheet-like material of the present invention, a method in which composite fiber webs are entangled with a needle punch or water-jet punch, a spunbond method, a melt blowing method, and a paper making method can be adopted. Of these, the method using the needle punch, water-jet punch, or the like is preferably used, when the embodiment of ultrafine fiber bundles as described above is adopted.

The nonwoven fabric can be a laminate in which the nonwoven fabric is integrated with the nonwoven or knitted fabric, as described above, and a method in which they are integrated with each other using the needle punch, water-jet punch, or the like is preferably used.

In the needle used in the needle punching treatment, the number of needle barbs (notches) is preferably 1 to 9 barbs. When the number of the needle barbs is preferably adjusted to one barb or more, the fibers can be efficiently entangled. On the other hand, when the number of the needle barbs is preferably adjusted to 9 barbs or less, the fiber damage can be suppressed.

The number of composite fibers which are hooked on the barbs depends on the shape of the barb and the diameter of the composite fiber. For that reason, as for the needle used in the needle punching step, a needle having barbs with a shape in which a kick-up is 0 to 50 μm, an undercut angle is 0 to 40°, a throat depth is 40 to 80 μm, and a throat length is 0.5 to 1.0 mm is preferably used.

The number of punchings is preferably 1000 to 8000 punchings/cm$^2$. When the number of punchings is preferably adjusted to 1000 punchings/cm$^2$ or more, a high accuracy finishing capable of providing high compactness can be obtained. On the other hand, when the number of punchings is preferably adjusted to 8000 punchings/cm$^2$ or less, the deterioration of the processability, the fiber damage, and the reduction of the strength can be prevented.

When the water-jet punching treatment is performed, it is preferable that water is in the state of a column-shaped flow. Specifically, it is a preferable embodiment that water is jetted from a nozzle having a diameter of 0.05 to 1.0 mm at a pressure of 1 to 60 MPa.

After the needle punching treatment or the water-jet punching treatment, the nonwoven fabric has an apparent density of preferably 0.15 to 0.45 g/cm$^3$. When the apparent density is preferably adjusted to 0.15 g/cm$^3$ or more, the sheet-like material can obtain the sufficient morphological stability and the dimensional stability. On the other hand, when the apparent density is preferably adjusted to 0.45 g/cm$^3$ or less, spaces sufficient for providing the elastic polymer can be maintained.

It is a preferable embodiment that the thus obtained nonwoven fabric is subjected to dry heating, wet heating, or combination thereof to shrink it and further to increase the density, in terms of the refinement. The nonwoven fabric may also be compressed in a thickness direction by a calendar treatment, or the like.

In the present invention, the polyurethane, which is the elastic polymer, is provided to the nonwoven fabric, and when the polyurethane is provided, the fabric may be either the nonwoven fabric composed of the composite fiber or the nonwoven fabric in which the fibers are converted into ultrafine fibers.

When the organic solvent is used as the solvent of the polyurethane, the coagulation can be performed by a dry heat coagulation, wet coagulation, or combination thereof. Of these, the wet coagulation is preferably used in which the polyurethane is immersed in water to coagulate it. When the wet coagulation is performed, the polyurethane is not concentrated at the entangled points of the ultrafine fibers, and the polyurethane itself becomes porous, and thus the degree of freedom of the ultrafine fibers to each other is increased, and the soft sheet-like material can be obtained. When the dispersion medium of the polyurethane is water, the coagulation may be performed by dry-heating coagulation, wet-heating coagulation, or combination thereof.

It is production efficiently preferable embodiment that after the elastic polymer is provided to the entangled fibers (nonwoven fabric), the obtained sheet-like material to which the elastic polymer is provided is cut in half or into several sections in a sheet thickness direction.

The sheet-like material of the present invention can have nap on at least one surface of the sheet-like material.

The buffing treatment in which the nap of the ultrafine fiber is formed on the surface of the sheet-like material of the present invention can be performed by using a sandpaper or a roll sander to grind the surface. A lubricant such as a silicone emulsion may be applied to the sheet-like material before the buffing treatment.

It is a preferable embodiment that an antistatic agent is applied to the material before the buffing treatment, because grinded particles, generated from the sheet-like material by the grinding, tend to be hardly accumulated on the sandpaper.

The sheet-like material may be dyed according to the use. As a method for dyeing the sheet-like material, it is preferable to use a jet dyeing machine, because the sheet-like material is dyed and at the same time a rubbing effect is provided to soften the sheet-like material. When the dyeing temperature of the sheet-like material is too high, the polymer elastomer may be deteriorated, and when the temperature is too low, the fibers are insufficiently dyed, and thus it is preferable that the temperature is set depending on the kind of the fiber. In general, the dyeing temperature is preferably 80 to 150° C., more preferably 110 to 130° C.

A dye can be selected depending on the kind of the fiber forming the sheet-like material. For example, when the polyester-based fiber is used, a disperse dye is used, when the polyamide-based fiber is used, an acid dye, a premetallized dye, or a mixture thereof may be used.

When the sheet-like material is dyed, it is preferable to use a dyeing auxiliary. When the dyeing auxiliary is used, the uniformity of dyeing and the reproducibility can be improved. In addition, a finishing agent treatment using a softener such as silicone, an antistatic, a water repellent, a flame retardant, a light resistant agent, an antibacterial agent, and the like may be performed in the bath using for dyeing or after the dyeing.

According to the present invention, it is possible to obtain the sheet-like material having the soft texture, the durability capable of withstanding practical use, and the abrasion resistance.

The sheet-like material of the present invention can be preferably used as skin materials used in furniture, chairs, wall covering, and seats, ceilings and interior finishing of interior of a vehicle such as a car, train or an airplane, interior materials having a very graceful appearance, skin materials of clothes, industrial materials, and the like.

EXAMPLES

The sheet-like material of the present invention is more specifically explained by means of Examples below.

[Evaluation Method]

[1] Melting Point (Tm) and Heat Quantity of Fusion (ΔH):

Measurement of a sample (polycarbonate diol) was performed using a differential scanning calorimeter [maker: TA Instruments Japan Inc. model number: Q20] in accordance with a method provided in JIS K7121-1987. The melting point (Tm) and the heat quantity of fusion (ΔH) were determined in accordance with a method provided in JIS K7121-1987 in procedures in which the temperature was elevated to from 20° C. to 80° C. at a speed of 10° C./minute, was maintained at 80° C. for 10 minutes, then was lowered to 20° C. at a speed of 10° C./minute, was maintained at 20° C. for 10 minutes, and was elevated to 80° C. at a speed of 10° C./minute again. The melting point was obtained from a melting peak at the second temperature elevation, and the heat quantity of fusion was obtained from a heat balance of the melting peak.

[2] Viscosity:

The viscosity was measured by using a B-type viscometer [BH-type viscometer manufactured by TOKI SANGYO CO., LTD] and a No. 7 rotor at the number of rotations of 20 rpm, after the temperature of a sample (a polyurethane resin solution) was controlled in a thermostatic water bath having a temperature of 20° C. for 5 hours.

[3] Average Single Fiber Diameter of Sheet-Like Material:

A cross-section of a nonwoven fabric containing fibers of a sheet-like material, vertical to a thickness direction of the fabric, was observed at 3000 magnifications using a scanning electron microscope (SEM, VE-7800-type manufactured by Keyence Corporation), and diameters of 50 single fibers, which were randomly extracted from a 30 μm×30 μm visual field, were measured at a unit of μm up to the first decimal place. The measurement was performed at 3 points, i.e., a total of 150 single fiber diameters were measured, and an average value was calculated up to the first decimal. When there were fibers having a fiber diameter of more than 50 μm, it was considered that those fibers did not correspond to the ultrafine fiber, and they were excluded from objects to be measured for the average fiber diameter. When the ultrafine fiber had a modified cross-section, first a cross-sectional area of the single fiber was measured, and supposing that the cross-section was a circle, a diameter thereof was calculated to obtain a diameter of the single fiber. An average value was calculated considering the values above as a population, which was defined as an average single fiber diameter.

[4] Softness of Sheet-Like Material:

Five specimens having a size of 2×15 cm (a vertical direction×a horizontal direction) were made in accordance with A method (45° Cantilever Method) described in 8.21.1 in 8.21 "Bending Stiffness" in JIS L 1096:2010 "Testing Methods for Woven and Knitted Fabrics". The specimens were put on a horizontal table having a slope with an angle of 45°. The specimens were slid, and scales were read when the central point on one end of the specimen was bought into contact with the slope. An average value of the 5 specimens was obtained.

[5] Evaluation of Abrasion of Sheet-Like Material:

Model 406, manufactured by James H. Heal & Co. was used as a Martindale abrasion tester, and ABRASTIVE CLOTH SM25, which was available from the same company, was used as a standard abrading cloth. A load of 12 kPa was applied to the sheet-like material, and abrasion was performed 20,000 times. The appearance of the sheet-like material was visually observed, and evaluation was performed about pilling. Criteria was that when the appearance of the sheet-like material was not changed at all compared to that before the abrasion, then the material was graded as 5, when a number of pills were generated, then the material was graded as 1, and between 5 and 1, graded at intervals of 0.5.

Using masses of the sheet-like material before and after the abrasion, a loss in mass by abrasion was calculated by the following formula:

Loss in mass by abrasion (mg)=a mass before abrasion (mg)−a mass after abrasion (mg)

[Notation of Chemical Substance]

Abbreviations of chemical substances used in Reference Examples have the following meanings:

EG: ethylene glycol
BG: 1,4-butanediol
MDI: 4,4'-diphenylmethane diisocyanate
HDI: hexamethylene diisocyanate
DMF: N,N-dimethylformamide
DMPA: 2,2-dimethylol propionic acid Reference Example 1

Synthesis of Polyurethane Resin (D-1)

Into a four-neck flask equipped with a stirrer and a thermometer were put 100 parts of a 1,10-decanediol (a2-1)/1,4-butanediol (a1-1) (molar ratio %: 91/9)copolymerized polycarbonate diol (A1-1) having a number-average molecular weight of 1,979 (a hydroxyl value of 56.7), 100 parts of a 3-methyl-pentanediol (a3-1)/1,6-hexanediol (a3-2) (molar ratio %: 50/50) copolymerized polycarbonate diol (A2-1) having a number-average molecular weight of 2,000 (hydroxyl value=56.1), 7.6 parts of EG (C-1), 61.6 parts of MDI (B-1), and 628 parts of DMF, and the reaction was performed at 70° C. for 15 hours in a dry nitrogen atmosphere to obtain a solution of a polyurethane resin (D-1) having a resin concentration of 30 wt %, a viscosity of 80,000 mPa·s/20° C., and a coagulation value of 3.8.

Reference Example 2

Synthesis of Polyurethane Resin (D-2)

Into the same reaction vessel used in Reference Example 1 were put 140 parts of 1,10-decanediol (a2-1)/1,4-butanediol (a1-1) (molar ratio %: 81/19) copolymerized polycarbonate diol (A1-2) having a number-average molecular weight 2,018 (a hydroxyl value of 55.6), 60 parts of 3-methyl-pentanediol (a3-1)/1,6-hexanediol (a3-2) (molar ratio %: 85/15) copolymerized polycarbonate diol (A2-2) having a number-average molecular weight 1,979 (a hydroxyl value of 57.5), 9.6 parts of EG (C-1), 73.1 parts of MDI (B-1), and 660 parts of DMF, and the reaction was performed at 65° C. for 20 hours in a dry nitrogen atmosphere to obtain a solution of a polyurethane resin (D-2) having a resin concentration of 30 wt %, a viscosity of 95,000 mPa·s/20° C., and a coagulation value of 3.4.

Reference Example 3

Synthesis of Polyurethane Resin (D-3)

Into the same reaction vessel used in Reference Example 1 were put 120 parts of a 1,10-decanediol (a2-1)/1,4-butanediol (a1-1) (molar ratio %: 71/29) copolymerized polycarbonate diol (A1-3) having a number-average molecular weight of 1,989 (a hydroxyl value of 56.4), 80 parts of 3-methyl-pentanediol (a3-1)/1,6-hexanediol (a3-2) (molar ratio %: 85/15) copolymerized polycarbonate diol (A2-2) having a number-average molecular weight of 1,979 (a hydroxyl value of 57.5), 59.3 parts of MDI (B-1), and the reaction was performed at 80° C. for 3 hours in a dry nitrogen atmosphere to obtain a urethane prepolymer having NCO terminals (NCO %=5.43%). The urethane prepolymer was cooled to room temperature, then 610 parts of DMF was added thereto and dissolved uniformly to obtain a solution of urethane prepolymer having an NCO %=1.29%. Next, 2.3 parts of water was added thereto, and the reaction was performed at 55° C. for 6 hours. After that, 10 parts of methanol was added thereto to stop the reaction, and a solution of a polyurethane resin (D-3) having a resin concentration of 25 wt %, a viscosity of 20,000 mPa·s/20° C., and a coagulation value of 3.6 was obtained.

Reference Example 4

Synthesis of Polyurethane Resin Water Dispersion (P-1)

Into a pressurizable vessel equipped with a stirrer and a thermometer were put 120 parts of a 1,10-decanediol (a2-1)/1,4-butanediol (a1-1) (molar ratio %: 71/2) copolymerized polycarbonate diol (A1-3) having a number-average molecular weight of 1,989 (a hydroxyl value of 56.4), 80 parts of a 3-methyl-pentanediol (a3-1)/1,6-hexanediol (a3-2) (molar ratio %: 85/15) copolymerized polycarbonate diol (A2-2) having a number-average molecular weight of 1,979 (a hydroxyl value of 57.5), 0.01 parts of EG (C-1), 5.02 parts of DMPA (A3-1), 56.0 parts of HDI (B-2), and 112 parts of acetone, and the reaction system was substituted by nitrogen gas. After that, the reaction was performed under stirring at 80° C. for 12 hours to obtain an acetone solution of a urethane prepolymer having terminal isocyanate groups. The obtained acetone solution was cooled to room temperature, and 742.9 parts of acetone as a diluting solvent and 7.1 parts of triethyl amine as a neutralizing agent, and 583.3 parts of water were added to the acetone solution, and the mixture was stirred for one minute in a homomixer to emulsify it. Then, acetone was distilled away in a reduced pressure, and the resulting product was cooled to room temperature, to which water was added to adjust the solid content to 40 wt %, thereby obtaining an aqueous polyurethane resin dispersion (P-1).

Reference Example 5

Synthesis of Polyurethane Resin (D-4)

Into the same reaction vessel used in Reference Example 1 were put 200 parts of a 1,10-decanediol (a2-1)/1,4-butanediol (a1-1) (molar ratio %: 81/19) copolymerized polycarbonate diol (A1-2) having a number-average molecular weight of 2,018 (a hydroxyl value of 55.6), 12.5 parts of BG (C-2), 65.4 parts of MDI (B-1), and 648 parts of DMF, and the reaction was performed at 70° C. for 15 hours in a dry nitrogen atmosphere to obtain a solution of a polyurethane resin (D-4) having a resin concentration of 30 wt %, a viscosity of 90,000 mPa·s/20° C., and a coagulation value of 2.6.

Reference Example 6

Synthesis of Polyurethane Resin (D-5)

Into the same reaction vessel used in Reference Example 1 were put 200 parts of a 3-methyl-pentanediol (a3-1)/1,6-hexanediol (a3-2) (molar ratio %: 85/15) copolymerized polycarbonate diol (A2-2) having a number-average molecular weight of 1,979 (a hydroxyl value of 57.5), 12.8 parts of BG (C-2), 67.1 parts of MDI (B-1), and 653 parts of DMF, and the reaction was performed at 70° C. for 15 hours in a dry nitrogen atmosphere to obtain a solution of a polyurethane resin (D-5) having a resin concentration of 30 wt %, a viscosity of 82,000 mPa·s/20° C., and a coagulation value of 6.0.

Reference Example 7

Synthesis of Polyurethane Resin (D-6)

Into the same reaction vessel used in Reference Example 1 were put 120 parts of a 1,10-decanediol (a2-1)/1,4-butanediol (a1-1) (molar ratio %: 81/19) copolymerized polycarbonate diol (A1-2) having a number-average molecular weight 2,018 (a hydroxyl value of 55.6), 80 parts of a 1,6-hexanediol (a3-2) polycarbonate diol (A2'-1) having a number-average molecular weight of 2,000 (a hydroxyl value of 56.1), 12.6 parts of BG (C-2), 66.0 parts of MDI (B-1), and 650 parts of DMF, and the reaction was performed at 70° C. for 15 hours in a dry nitrogen atmosphere to obtain a solution of a polyurethane resin (D-6) having a resin concentration of 30 wt %, a viscosity of 82,000 mPa·s/20° C., and a coagulation value of 3.3.

Reference Example 8

Synthesis of Polyurethane Resin (D-7)

Into the same reaction vessel used in Reference Example 1 were put 120 parts of a 1,10-decanediol (a2-1) polycarbonate diol (A1'-2) having a number-average molecular weight of 2,036 (a hydroxyl value of 55.1), 80 parts of a 3-methyl-pentanediol (a3-1)/1,6-hexanediol (a3-2) (molar ratio %: 85/15) copolymerized polycarbonate diol (A2-2) having a number-average molecular weight of 1, 979 (a hydroxyl value of 57.5), 12.6 parts of BG (C-2), 66.0 parts of MDI (B-1), and 650 parts of DMF, and the reaction was performed at 70° C. for 15 hours in a dry nitrogen atmosphere to obtain a solution of a polyurethane resin (D-7) having a resin concentration of 30 wt %, a viscosity of 82,000 mPa·s/20° C., and a coagulation value of 3.0.

Reference Example 9

Synthesis of Polyurethane Resin (D-8)

Into the same reaction vessel used in Reference Example 1 were put 120 parts of a 1,6-hexanediol (a2'-2) polycarbonate diol (A1'-5) having a number-average molecular weight of 2,000 (a hydroxyl value of 56.1), 80 parts of a 3-methyl-pentanediol (a3-1)/1,6-hexanediol (a3-2) (molar ratio %: 85/15) copolymerized polycarbonate diol (A2-2) having a number-average molecular weight of 1,979 (a hydroxyl value of 57.5), 12.7 parts of BG (C-2), 66.5 parts of MDI (B-1), and 652 parts of DMF, and the reaction was performed at 70° C. for 15 hours in a dry nitrogen atmosphere to obtain a solution of a polyurethane resin (D-8)

having a resin concentration of 30 wt %, a viscosity of 86,000 mPa·s/20° C., and a coagulation value of 5.4.

Reference Example 10

Synthesis of Polyurethane Resin (P-2)

Into the same reaction vessel used in Reference Example 4 were put 120 parts of a 1,10-decanediol (a2-1)/1,4-butanediol (a1-1) (molar ratio %: 71/29) copolymerized polycarbonate diol (A1-3) having a number-average molecular weight of 1,989 (a hydroxyl value of 56.4), 80 parts of a 1,6-hexanediol (a3-2) polycarbonate diol (A2'-1) having a number-average molecular weight of 2,000 (a hydroxyl value of 56.1), 8.9 parts of EG (C-1), 5.02 parts of DMPA (A3-1), 56.0 parts of HDI (B-2), and 112 parts of acetone, and the reaction system was substituted by nitrogen gas. After that, the reaction was performed under stirring at 80° for 12 hours to obtain an acetone solution of a urethane prepolymer having isocyanate groups at terminals. The obtained acetone solution was cooled to room temperature, and 742.9 parts of acetone as a diluting solvent and 7.1 parts of triethyl amine as a neutralizing agent. To the acetone solution was added 583.3 parts of water, and the mixture was stirred for one minute in a homomixer to emulsify it. Then, acetone was distilled away in a reduced pressure, and the resulting product was cooled to room temperature, to which water was added to adjust the solid content to 40 wt %, thereby obtaining an aqueous polyurethane resin dispersion (P-2).

The polyurethane resins in Reference Examples 1 to 10 are collectively shown in Table 1. The 1,10-decanediol (a2-1) used in Reference Examples was a bio-based raw material. A ratio of a bio-based component in the polyurethane resin was calculated based on the ratio of a bio-based component in the raw Material, and the results are shown in Table 1.

Example 1

(Nonwoven Fabric)
An islands-in-the-sea fiber having a composite ratio of 20 mass % of a sea component and 80 mass % of an island component, the number of islands of 16 islands/filament, and an average single fiber diameter of 20 μm, was obtained using a polystyrene as the sea component and a polyethylene terephthalate as the island component. The obtained islands-in-the-sea fibers were cut into staples having a fiber length of 51 mm, and they were passed through a card and a cross lapper to form fiber webs. The webs were subjected to a needle punching treatment to obtain a nonwoven fabric having a total weight of 750 g/m² and a thickness of 3.2 mm.
(Conversion of Fiber into Ultrafine Fiber)
The nonwoven fabric described above was immersed in trichloroethylene and squeezed in a mangle, and the procedures were repeated 5 times to obtain a sheet composed of the ultrafine fibers in which the sea component was removed from the islands-in-the-sea fiber.
(Provision of Polyurethane Resin)
The sheet composed of the ultrafine fibers, obtained as above, was immersed in a solution of the polyurethane resin (D-1) whose solid concentration was adjusted to 12 wt %, and then the polyurethane resin was coagulated in an aqueous solution having a DMF concentration of 30 wt %. After that, the sheet was dried with hot wind having a temperature of 110° C. for 10 minutes to obtain a sheet to which the polyurethane resin was provided, having a thickness of 1.9 mm.
(Cutting in Half and Buffing)
The sheet to which the polyurethane resin was provided, obtained as above, was cut in half vertically to the thickness direction into two sections, and the cut surface was grinded with a No. 240 count endless sandpaper to obtain a napped sheet-like material having a thickness of 0.75 mm.
(Dyeing and Finishing)
The napped sheet-like material obtained as above was dyed with a black dye using a jet dyeing machine at a temperature condition of 120° C., and then was dried in a drying machine to obtain a sheet-like material whose-average single fiber diameter of the ultrafine fiber was of 4.4 μm. The obtained sheet-like material had the soft texture and the good abrasion resistance.

Examples 2 and 3

A sheet-like material was obtained in the same manner as in Example 1 except that D-2 or D-3 was used instead of the polyurethane resin used in Example 1. The obtained sheet-like material had the soft texture and the good abrasion resistance.

Example 4

(Nonwoven Fabric)
An islands-in-the-sea fiber having a composite ratio of 20 mass % of a sea component and 80 mass % of an island component, the number of islands of 16 islands/filament, and an average single fiber diameter of 20 μm, was obtained using a polyethylene terephthalate copolymerized with 8 mol % of sodium 5-sulfoisophthalate as the sea component and a polyethylene terephthalate as the island component. The obtained islands-in-the-sea fibers were cut into staples having a fiber length of 51 mm, and they were passed through a card and a cross lapper to form fiber webs. The webs were subjected to a needle punching treatment to obtain a nonwoven fabric having a total weight of 730 g/m² and a thickness of 3.0 mm.
(Conversion of Fiber into Ultrafine Fiber)
The nonwoven fabric described above was immersed in an aqueous sodium hydroxide solution having a temperature of 95° C. and a concentration of 10 g/L for 30 minutes to obtain a sheet composed of ultrafine fibers in which the sea component was removed from the islands-in-the-sea fiber.
(Provision of Polyurethane Resin)
The sheet composed of the ultrafine fibers, obtained as above, was immersed in an aqueous polyurethane resin P-1 dispersion the whose solid concentration was adjusted to 10 wt %, and then the sheet was dried with hot wind having a temperature of 110° C. for 15 minutes to obtain a sheet to which the polyurethane resin was provided, having a thickness of 1.8 mm.
(Cutting in Half and Buffing)
The sheet to which the polyurethane resin was provided, obtained as above, was cut in half vertically to the thickness direction into two sections, and the cut surface was grinded with a No. 240 count endless sandpaper to obtain a napped sheet-like material having a thickness of 0.7 mm.
(Dyeing and Finishing)
The napped sheet-like material obtained as above was dyed with a black dye using a jet dyeing machine at a temperature condition of 120° C., and then was dried in a drying machine to obtain a sheet-like material whose average single fiber diameter of the ultrafine fiber was of 4.4 μm. The obtained sheet-like material had the soft texture and the good abrasion resistance.

Comparative Examples 1 to 5

A sheet-like material was obtained in the same manner as in Example 1 except that each of D-4 to D-8 was used instead of the polyurethane resin used in Example 1. The obtained sheet-like material did not have both of the soft texture and the good abrasion resistance.

Comparative Example 6

A sheet-like material was obtained in the same manner as in Example 4 except that P-2 was used instead of the polyurethane resin used in Example 4. The obtained sheet-like material did not have both of the soft texture and the good abrasion resistance.

The evaluation results in Examples 1 to 4 and Comparative Examples 1 to 6 are shown in Table 2.

TABLE 1-1

|  |  |  | Reference Example 1 | Reference Example 2 | Reference Example 3 | Reference Example 4 | Reference Example 5 |
|---|---|---|---|---|---|---|---|
|  | Polyurethane resin (D) |  | D-1 | D-2 | D-3 | P-1 | D-4 |
| Polycarbonate diol (A1) | Alkane diol (a1) | — | 1,4-butane diol | 1,4-butane diol | 1,4-butane diol | 1,4-butane diol | 1,4-butane diol |
|  | Alkane diol (a2) | — | 1,10-decane diol | 1,10-decane diol | 1,10-decane diol | 1,10-decane diol | 1,10-decane diol |
|  | Melting point (Tm) | °C. | 51.2 | 47.2 | 43.8 | 43.8 | 47.2 |
|  | Heat quantity of fusion (ΔH) | J/g | 68.1 | 61.5 | 54.8 | 54.8 | 61.5 |
|  | Molar ratio of (a2) with respect to total of (a1) and (a2) | mol % | 91 | 81 | 71 | 71 | 81 |
| Polycarbonate diol (A2) | Alkane diol (a3) | — | 3-methyl-pentanediol | 3-methyl-pentanediol | 3-methyl-pentanediol | 3-methyl-pentanediol | — |
|  |  | — | 1,6-hexane diol | 1,6-hexane dial | 1,6-hexane diol | 1,6-hexane diol | — |
|  | Melting point (Tm) | °C. | No observation | No observation | No observation | No observation | — |
|  | Heat quantity of fusion (ΔH) | J/g | 0 | 0 | 0 | 0 | — |
| Mass ratio of (A1) with respect to mixture (A12) |  | % | 50 | 70 | 60 | 60 | — |
| ΔTm between mixture (A12) and (A1) |  | °C. | 0.8 | 0.9 | 0 | 0 | — |
| ΔH of mixture (A12) |  | J/g | 36.4 | 31.5 | 31.5 | 31.5 | — |
| Compound (A3) having phydrophilic group and active hydrogen |  | — | — | — | — | DMPA | — |
| Organic diisccyanate (B) |  | — | MDI | MDI | MDI | HDI | MDI |
| Chain extender (C) |  | — | EG | EG | water | EG | BG |
| Mass ratio of bio-based component in urethane resin |  | % | 33 | 41 | 35 | 35 | 60 |

|  |  |  | Reference Example 6 | Reference Example 7 | Reference Example 8 | Reference Example 9 | Reference Example 10 |
|---|---|---|---|---|---|---|---|
|  | Polyurethane resin (D) |  | D-5 | D-6 | D-7 | D-8 | P-2 |
| Polycarbonate diol (A1) | Alkane diol (a1) | — | — | 1,4-butane diol | — | 1,6-hexane diol | 1,4-butane diol |
|  | Alkane diol (a2) | — | — | 1,10-decane diol | 1,10-decane diol | — | 1, 10-decane diol |
|  | Melting point (Tm) | °C. | — | 47.2 | 55.7 | 50.7 | 47.2 |
|  | Heat quantity of fusion (ΔH) | J/g | — | 61.5 | 78.9 | 39.8 | 61.5 |
|  | Molar ratio of (a2) with respect to total of (a1) and (a2) | mol % | — | 81 | 100 | — | — |
| Polycarbonate diol (A2) | Alkane diol (a3) | — | — | 3-methyl-pentanediol | — | 3-methyl-pentanediol | 3-methyl-pentanediol |
|  |  | — | — | 1,6-hexane diol | 1,6-hexane diol | 1,6-hexane diol | 1,6-hexane diol |
|  | Melting point (Tm) | °C. | — | 50.7 | No observation | No observation | 50.7 |
|  | Heat quantity of fusion (ΔH) | J/g | — | 39.8 | 0 | 0 | 39.8 |
| Mass ratio of (A1) with respect to mixture (A12) |  | % | — | 60 | — | 60 | 60 |
| ΔTm between mixture (A12) and (A1) |  | °C. | — | 0.2 | 0.2 | 3.4 | 0.2 |
| ΔH of mixture (A12) |  | J/g | — | 58.4 | 43.4 | 24.1 | 58.4 |
| Compound (A3) having phydrophilic group and active hydrogen |  | — | — | — | — | — | DMPA |
| Organic diisocyanate (B) |  | — | MDI | MDI | MDI | MDI | HDI |
| Chain extender (C) |  | — | BG | BG | BG | BG | EG |
| Mass ratio of bio-based component in urethane resin |  | % | 0 | 36 | 0 | 0 | 37 |

TABLE 2-1

|  |  | Example 1 | Example 2 | Example 3 | Example 4 | Comparative Example 1 | Comparative Example 2 |
|---|---|---|---|---|---|---|---|
| Polyurethane (D) | | D-1 | D-2 | D-3 | P-1 | D-4 | D-5 |
| Fiber diameter | μm | 4.4 | 4.4 | 4.4 | 4.4 | 4.4 | 4.4 |
| Softness | mm | 26 | 28 | 32 | 38 | 44 | 52 |
| Loss in mass by abrasion | mg | 4.2 | 4.6 | 5.0 | 4.3 | 6.3 | 7.1 |
| Pilling evaluation | Grade | 4.5 | 4 | 3 | 4 | 2 | 2 |

|  |  | Comparative Example 3 | Comparative Example 4 | Comparative Example 5 | Comparative Example 6 |
|---|---|---|---|---|---|
| Polyurethane (D) | | D-6 | D-7 | D-8 | P-2 |
| Fiber diameter | μm | 4.4 | 4.4 | 4.4 | 4.4 |
| Softness | mm | 55 | 54 | 68 | 72 |
| Loss in mass by abrasion | mg | 4.8 | 4.7 | 6.6 | 4.6 |
| Pilling evaluation | Grade | 3 | 3 | 2 | 4 |

The invention claimed is:

1. A sheet-like material comprising a nonwoven fabric composed of an ultrafine fiber having an average single fiber diameter of 0.3 to 7 μm; and an elastic resin, wherein the elastic resin is a polyurethane resin (D) which contains: as essential constituent monomers, a copolymerized polycarbonate diol (A1) which contains a structural unit derived from C3-5 alkane diol (a1) and a structural unit derived from C8-12 alkane diol (a2), the molar ratio of the alkanediol (a2) with respect to the total number of moles of the alkanediol (a1) and the alkanediol (a2) being 50 to 95 mole %; a polycarbonate diol (A2) containing a structural unit derived from a C4-6 alkane diol (a3); an organic diisocyanate (B); and a chain extender (C), and the polyurethane resin (D) satisfies the following conditions (1) to (3):

(1) The copolymerized polycarbonate diol (A1) has a heat quantity of fusion (ΔH) of 40 to 100 J/g, the heat quantity of fusion (ΔH) being determined in accordance with a melting point measuring method provided in JIS K7121-1987;

(2) The polycarbonate diol (A2) has a heat quantity of fusion (ΔH) of 0 J/g;

(3) A difference (ΔTm) in a melting point (Tm) between a mixture (A12) of the copolymerized polycarbonate diol (A1) with the polycarbonate diol (A2) and the copolymerized polycarbonate diol (A1) is 1.5° C. or lower, the melting point (Tm) being determined by a melting point measuring method provided in JIS K7121-1987.

2. The sheet-like material according to claim 1, wherein the mixture (A12) of the copolymerized polycarbonate diol (A1) with the polycarbonate diol (A2) has a heat quantity of fusion (ΔH) of 10 to 55 J/g.

3. The sheet-like material according to claim 1, wherein the alkanediol (a1) is a linear alkanediol and the alkanediol (a2) is a linear alkanediol.

4. The sheet-like material according to claim 1, wherein a mass ratio of the copolymerized polycarbonate diol (A1) with respect to the total mass of the copolymerized polycarbonate diol (A1) and the polycarbonate diol (A2) is 30 to 80 mass %.

5. The sheet-like material according to claim 1, wherein at least one of the alkanediol (a1) and the alkanediol (a2) is a bio-based alkanediol.

6. The sheet-like material according to claim 1, wherein the polyurethane resin (D) is a polyurethane resin (D1) containing, as an essential constituent monomer, a compound (A3) having a hydrophilic group and an active hydrogen.

7. The sheet-like material according to claim 2, wherein a mass ratio of the copolymerized polycarbonate diol (A1) with respect to the total mass of the copolymerized polycarbonate diol (A1) and the polycarbonate diol (A2) is 30 to 80 mass %.

8. The sheet-like material according to claim 2, wherein at least one of the alkanediol (a1) and the alkanediol (a2) is a bio-based alkanediol.

9. The sheet-like material according to claim 3, wherein at least one of the alkanediol (a1) and the alkanediol (a2) is a bio-based alkanediol.

* * * * *